(12) United States Patent
Moro et al.

(10) Patent No.: US 6,819,363 B2
(45) Date of Patent: Nov. 16, 2004

(54) VIDEO SIGNAL PROCESSING DEVICE

(75) Inventors: Eiji Moro, Tokyo (JP); Ken Sodeyama, Tokyo (JP); Hiroyuki Hori, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 483 days.

(21) Appl. No.: 09/922,318

(22) Filed: Aug. 2, 2001

(65) Prior Publication Data

US 2002/0075405 A1 Jun. 20, 2002

(30) Foreign Application Priority Data

Dec. 14, 2000 (JP) ........................................ 2000-384900

(51) Int. Cl.$^7$ .............................. H04N 9/50; H04L 7/00
(52) U.S. Cl. ...................... 348/540; 348/497; 375/354
(58) Field of Search ............................... 348/540, 525, 348/533, 537–538, 498, 500, 521, 530, 497, 431, 565, 639; 375/354–355

(56) References Cited

U.S. PATENT DOCUMENTS

| | | | | |
|---|---|---|---|---|
| 4,212,027 A | * | 7/1980 | Lemoine | 348/498 |
| 4,600,937 A | * | 7/1986 | Kudo et al. | 348/555 |
| 4,736,238 A | * | 4/1988 | Moriyama et al. | 348/498 |
| 4,792,853 A | * | 12/1988 | Yamagishi et al. | 348/526 |
| 5,132,794 A | * | 7/1992 | Okada et al. | 348/531 |
| 5,309,236 A | * | 5/1994 | Park | 348/500 |
| 5,475,440 A | * | 12/1995 | Kobayashi et al. | 348/498 |
| 5,576,770 A | * | 11/1996 | Rumreich | 348/525 |
| 5,754,250 A | * | 5/1998 | Cooper | 348/525 |
| 5,900,914 A | * | 5/1999 | Niijima | 348/521 |
| 5,907,367 A | * | 5/1999 | Edwards et al. | 348/501 |
| 6,107,984 A | * | 8/2000 | Naka et al. | 345/99 |
| 6,226,039 B1 | * | 5/2001 | Yoon | 348/445 |
| 6,590,616 B1 | * | 7/2003 | Takeuchi | 348/572 |

FOREIGN PATENT DOCUMENTS

| | | |
|---|---|---|
| JP | 03-187068 | 8/1991 |
| JP | 06-086226 | 3/1994 |
| JP | 11-196381 | 7/1999 |

* cited by examiner

Primary Examiner—Michael H. Lee
Assistant Examiner—Paulos M Natnael
(74) Attorney, Agent, or Firm—Townsend and Townsend and Crew LLP

(57) ABSTRACT

For horizontal sync information HD suitable for use in image processing module, e.g., module for TBC features, image compression recording/playback features, and LCD displaying features, it would be desirable that the time base fluctuations of the video input signal is faithfully reflected and that an interpolated HD generating feature is provided. A module for generating pulses generates the trailing edges of Csync as the trailing edge HD, and switches to an interpolated HD when a dropped pulse is detected after a few microseconds delay in the leading edge relative to the standard pulse. Thus, the trailing edge HD is selected within a time base fluctuation on the order of a few microseconds and the time base fluctuation is faithfully reflected and interpolation features can also be provided.

6 Claims, 6 Drawing Sheets

VIDEO SIGNAL PROCESSING DEVICE

BACKGROUND OF THE INVENTION

Time base correction (hereinafter referred to as TBC) in which information is written to memory is a type of technology where horizontal sync information generated from a sync signal in a video signal is used to process images from a video signal.

One example of this technology is presented in Japanese patent number 2844765 ("Video signal playback device").

FIG. 2 from this patent shows a block diagram of a TBC architecture. The output from a sync separator 33 (indicated in the figure as SYNC SEPA 33) is sent to a timing GEN 35 by way of a PLL 34. A write clock WCK and a write reset pulse WRES, generated by the timing GEN, provide control for write operations to buffer memories 40, 46. There is no description, however, of the sync separator 33 and how the HD signal is generated from the separated composite sync signal.

The basic principle behind the TBC technology described above is as follows. A video input signal containing time base fluctuations is written to memory with a sync signal containing similar time base fluctuations serving as a write trigger. Reading from memory is started using a stable read trigger. For TBC technology involving line memory, the composite sync signal is generally separated from the video input signal and the horizontal sync information HD from which equalizing pulses have been removed is used as the write trigger.

One aspect of improving TBC performance is generating the HD signal so that it faithfully preserves the time base fluctuations of the video input signal. If this is not done effectively, the inconsistencies between the two time base fluctuations will lead to time base fluctuations in the TBC output signal.

Another aspect of improving TBC performance is generating HD interpolation information when there is a dropped sync signal in the video input signal. Without this feature, writes to memory will stop during the corresponding interval, and the image display position of the subsequent TBC output will be shifted upward on the screen.

One method for generating an interpolated HD signal when there is a dropped sync signal involves using PLL technology. A detailed description of PLL technology will be omitted since it is a widely known technology. By using a high PLL time constant setting, an interpolated HD can be generated even if there is some degree of sync dropping. However, if skew is present in the video input signal, the time constant will aggravate the problem. Immediate tracking of the skew in the video signal will be prevented, and the PLL-generated HD signal will indicate the tracking characteristics at the time constant described above. This tracking delay will obstruct generation of an HD that faithfully preserves the time base fluctuations contained in the video input signal, resulting in skewing in the TBC output image.

The object of the present invention is to provide means for generating HD pulses suited for image processing using HD pulses, e.g., TBC memory writing operations. Another object of the present invention is to provide a video signal processing device equipped with the same.

SUMMARY OF THE INVENTION

The present invention relates to a video signal processing device including means for processing images writing image information from a video signal to a digital storage medium, means for converting data converting the image information to a predetermined format, or means for display control displaying the image information, and the like. More specifically, the present invention relates to a video signal processing device performing at least part of the processing of image processing means described above using horizontal sync information (hereinafter referred to as HD) generated from a sync signal of the video signal.

The video signal processing device of the present invention includes: means for separating a composite sync signal from a video input signal; means for generating pulses receiving the composite sync signal from sync separating means and generating a horizontal sync information HD; and means for processing images receiving image information contained in the first video signal and the HD information and performing image processing.

Furthermore, pulse generating means includes means for detecting leading edges of the composite sync signal and means for detecting trailing edges. Timing for the HD information is controlled based on the timing of trailing edges.

The present invention provides pulse generating means generating horizontal sync information HD suited for serving as part of image processing means such as means for providing TBC functions, image compression recording/playback functions, and LCD display functions. The present invention also provides a video signal processing device containing the same.

A block diagram of an embodiment of the present invention.

FIG. 2

A block diagram of an embodiment of the present invention.

FIG. 3

A block diagram of an embodiment of the present invention.

FIG. 4

A block diagram of an embodiment of the present invention.

FIG. 5

A block diagram of a pulse generator 5 according to an embodiment of the present invention.

FIG. 6

A timing chart for HD pulse generation by a pulse generator 5 according to an embodiment of the present invention.

DESCRIPTION OF THE PREFERRED EMBODIMENTS

The following is a description of the embodiments of the present invention.

Figure 1:
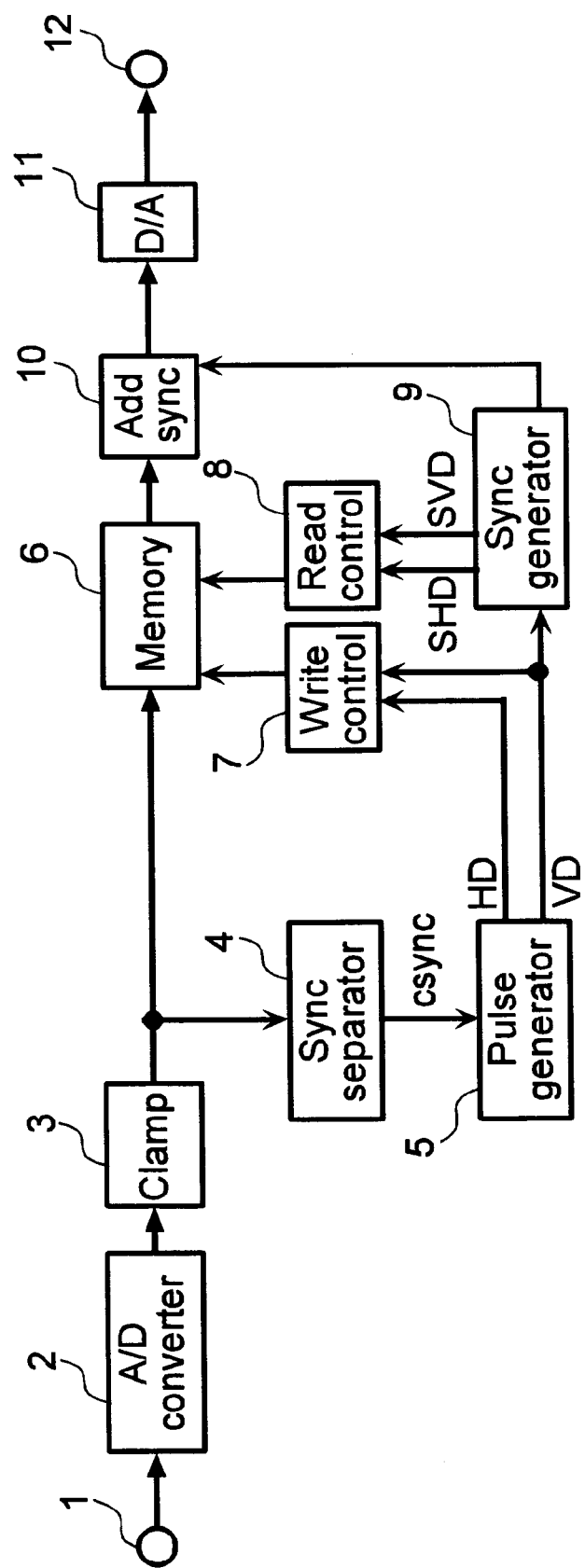
FIG. 1

FIG. 1 shows a block diagram of an embodiment of the present invention for implementing a TBC function. A video signal received by way of a terminal 1 is converted into a digital signal by an AID converter 2. The signal passes through a clamp circuit 3 and is sent to a line memory 6 and a sync separator 4. A composite sync signal Csync is output as the separated sync signal from the sync separator 4. A pulse generator 5 generates horizontal sync information HD and vertical sync information VD based on Csync. A write control circuit 7 receives HD, which contains the same time base fluctuations as the input signal, and uses HD as a trigger to generate write addresses for a horizontal scan period (hereinafter referred to as 1 line). As a result, the writing of the video signal to the line memory 6 is performed one line at a time with HD serving as a trigger.

The sync generator 9 counts the system clock and generates standard vertical sync information SVD and standard horizontal sync information SHD, roughly matching the period of a standard signal. The read control circuit 8 receives SHD and SVD and generates read addresses with matching horizontal and vertical syncs. As a result, the video signal read from the line memory 6 has a period similar to that of a standard signal, i.e., time base fluctuations are eliminated from the video signal. Also, the sync generator receives VD and keeps the phase difference between SVD and VD within a desired range so that disruption of the memory 6 is avoided. Synchronization is added to the video signal output from the memory 6 by a sync adding circuit 10 based on the timing provided by the sync generator 9. The signal is then converted to an analog signal by a D/A converter 11 and output through a terminal 12.

Figure 5:
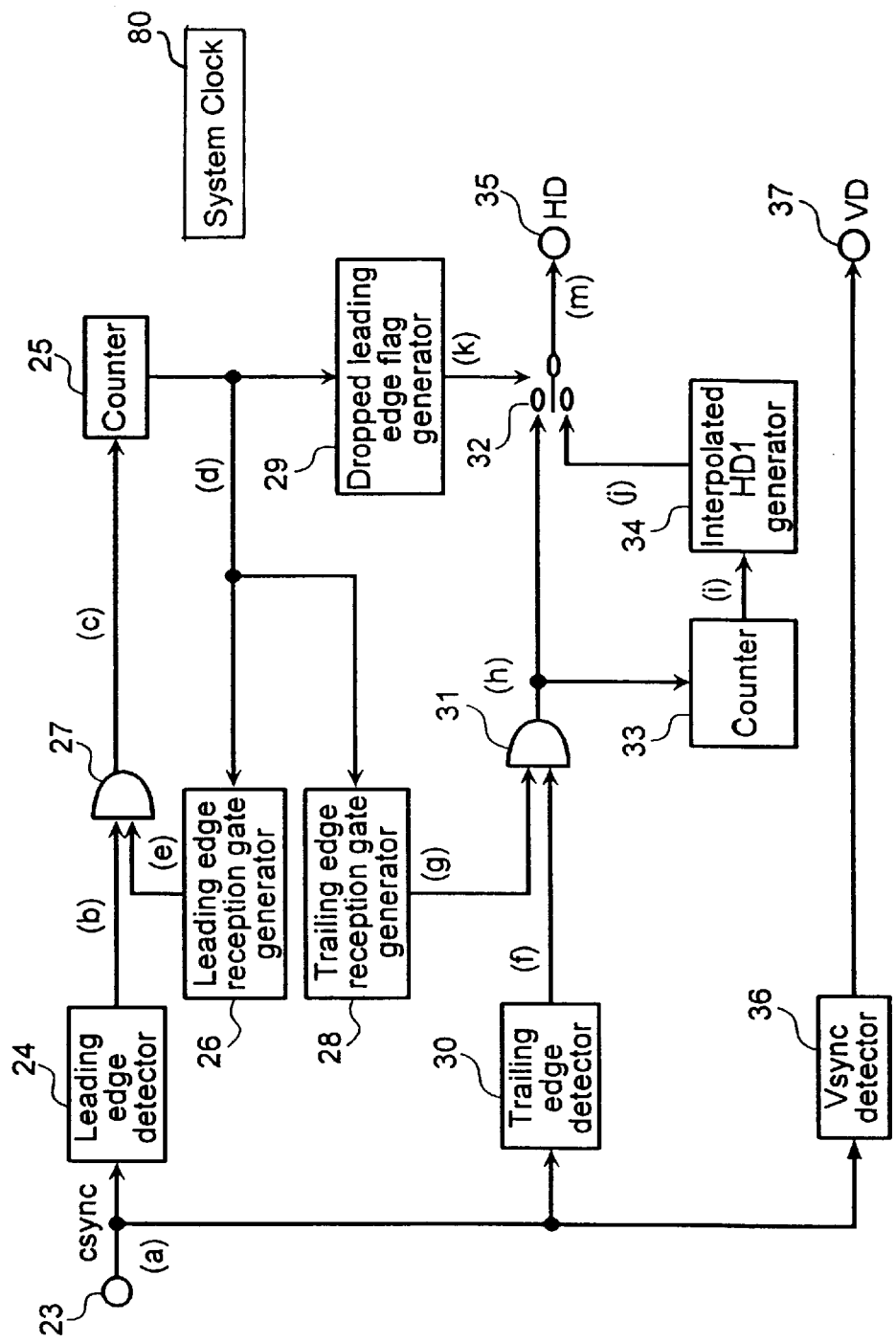
Figure 6:
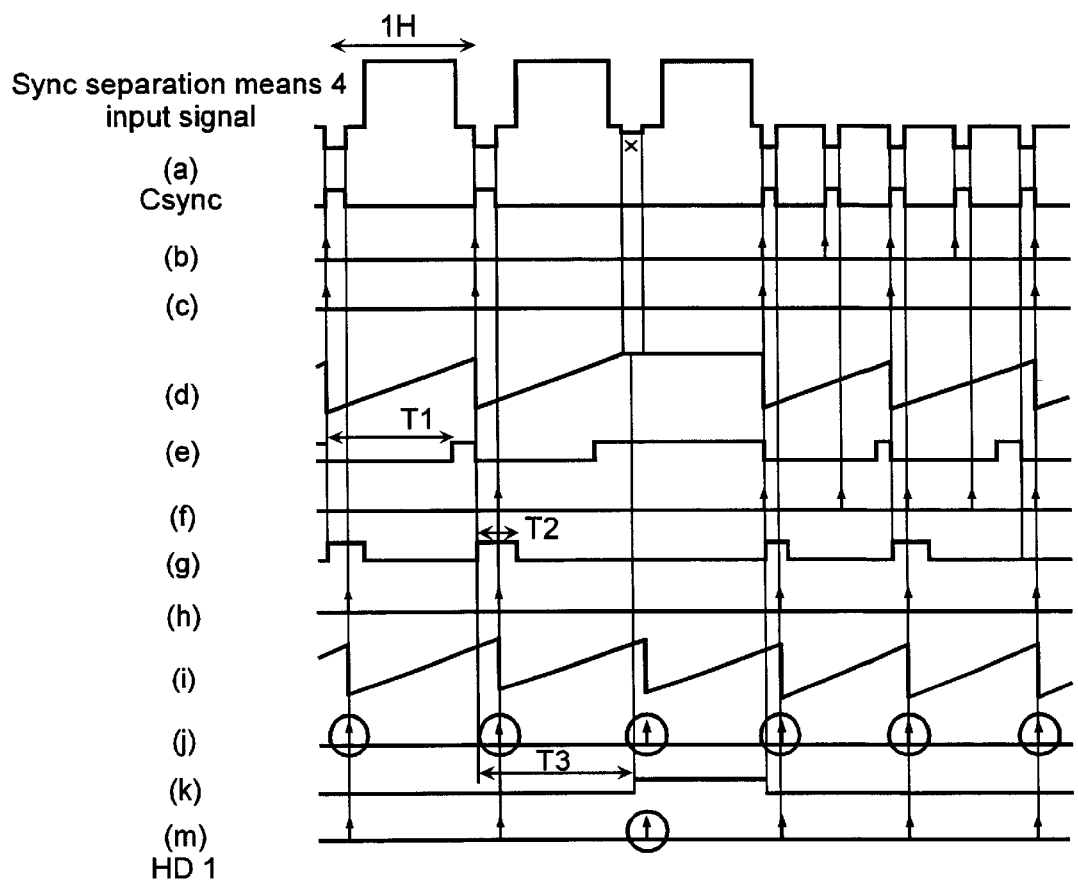

FIG. 5 shows a block diagram of the pulse generator 5 described above. FIG. 6 shows a timing chart for the HD signal from the pulse generator 5. A Csync signal (a) received from a terminal 23 is sent to a leading edge detector 24, a trailing edge detector 30, and a Vsync detector 36.

An output signal (b) from the leading edge detector 24 and an output signal (e) from a leading edge receiving gate generator 26 are sent to an AND gate 27, which outputs a signal (c). The equalizing pulse leading edge contained in the signal (b) is blocked since it is ANDed when the signal (e) is low. Thus, in the signal (c), the equalizing pulse is eliminated. The leading edge receiving gate generator 26 generates a leading edge receiving gate signal (e) by outputting a high or low signal within a predetermined count value interval. A counter 25 is incremented by the system clock 80 and is reset to zero when the signal (c) is sent as a reset signal. The signal (e) turns low in an interval T1 from when the output from the counter 25 is zero to when it reaches a predetermined value P1. When the count is at or above the predetermined value P1, the signal becomes high. The leading edge of the equalizing pulse can be eliminated by setting the interval T1 to at least 0.5 H.

An output signal (f) from the trailing edge detector 30 and an output signal (g) from a trailing edge detection gate generator 28 are sent to an AND gate 31, which outputs a signal (h). The equalizing pulse trailing edge is blocked since it is ANDed with the signal (g) when it is low. Thus, the equalizing pulse is eliminated from the signal (h). The trailing edge receiving gate generator 28 is high or low during a predetermined count interval from the counter 25, thus generating the trailing edge receiving gate signal (g). The signal (g) is high during an interval T2 between when the output from the counter 25 is zero until it reaches a predetermined value P2, and is low when the count is at the predetermined value P2 or higher. By setting the interval T2 to be a larger value than a horizontal sync signal width Thsync in the Csync signal, the trailing edge signal (f) can be received. However, if T2 is greater than 0.5 H, the equalizing pulse trailing edge can be received as well, so it would be desirable to have T2 set to a value smaller than 0.5 H. In FIG. 6, the signal (g) is shown as being activated when the output from the counter 25 is zero, but this activation can be delayed by a few microseconds.

More specifically, since the gate should be opened before the trailing edge signal (f), the delay can be within a range of less than Thsync.

The counter 33 incremented by the system clock 80 as well, and is reset to zero when a reset from the signal (h) is received. The counter 33 is set up to loop automatically at a period of 1 H and, when the counter 33 is zero, an interpolated HD1 generator 34 outputs an interpolated HD signal (j). A switch 32 receives the signal (h) from a first input terminal and the signal (j) from a second input terminal. The switch 32 outputs one or the other input as a signal (in). In the switching performed by switch 32, the second input terminal is selected for output when a dropped leading edge flag signal (k) output from a dropped leading edge flag generator 29 is high, i.e., when a leading edge is missing. Otherwise, the signal from the first input terminal is output. The signal (m) is output from a terminal 35 as a horizontal sync information HD.

The dropped leading edge flag generator 29 generates the dropped leading edge flag signal (k) by outputting high or low during a predetermined count interval from the counter 25.

The signal (k) is low during an interval T3 from when the counter 25 is zero until it reaches a value P3, and is high when the count is at or above the predetermined value P3. The interval T3 is set to be in the following range: 1 H<T3<1 H+Thsync. By setting T3 to be greater than 1 H, dropped leading edges can be detected. By setting T3 to be less than 1 H+Thsync, the dropped leading edge flag signal (k) is activated before the interpolated HD, thus providing suitable interpolation switching for the switch 32. If, for example, T3=1 H+1 microsecond, the interpolated HD for the signal (j) will be selected if the horizontal scan period is greater than 1 H+1 microsecond, but the signal (h) will be selected if the horizontal scan period is less than 1 H+1 microsecond. In other words, when the horizontal scan period is longer within a 1 microsecond offset, an HD can be generated that faithfully preserves the time base fluctuations. For example, when the TBC technology described above is used on a standard video playback signal from a household VCR, the fluctuation in the horizontal scan period is usually 1 microsecond or less, so the time-base fluctuations can be faithfully preserved in the HD, thus providing good TBC features.

The Vsync detector 36 detects the Vsync information VD from the Csync signal (a) and outputs it through a terminal 37.

As described above, the horizontal sync information HD1 generated by the pulse generator 5 faithfully preserves time base fluctuations and also provides interpolation in the event of a dropped sync. Furthermore, equalizing pulses are removed. This makes it suitable for the TBC structure shown in FIG. 1.

Figure 2:
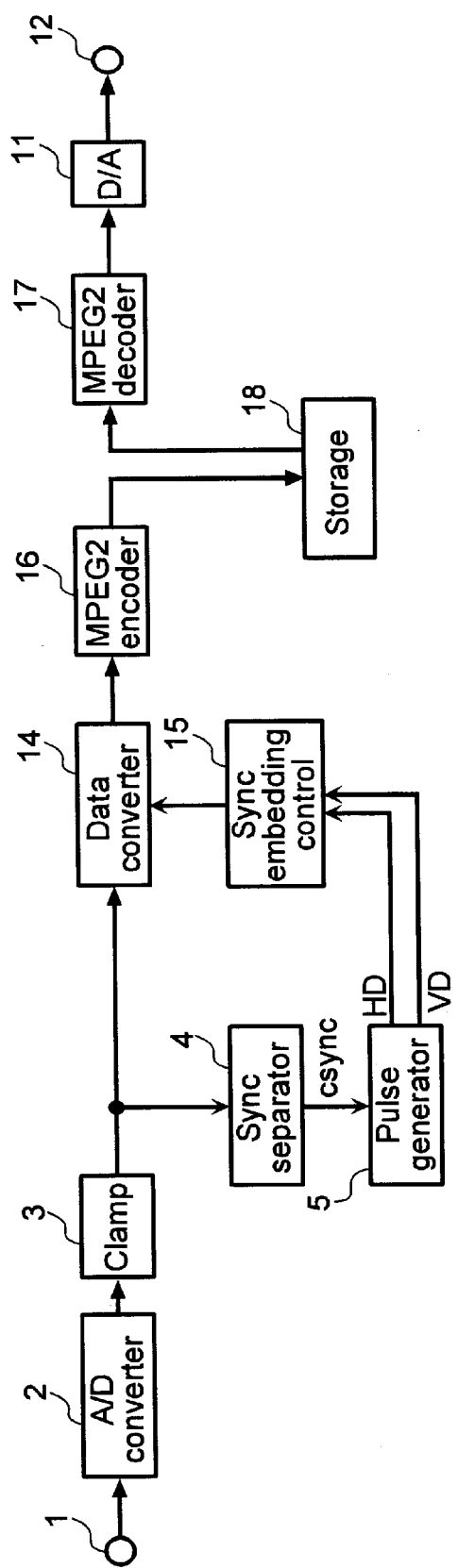

FIG. 2 shows a block diagram of another embodiment of the present invention different from the one shown in FIG. 1. This embodiment implements an image compression recording/playback feature. The following is a description of differences with the embodiment from FIG. 1. The video signal output from the clamp circuit 3 is converted by a data converter 14 into a data format such as one that conforms to ITU-R BT.656. A sync embedding control circuit 15 uses HD and VD output from the pulse generator 5 as timing information to control the embedding of sync signals for the data converter 14. The output from the data converter 14 is compressed using an MPEG2 encoder 16, and is stored in a storage circuit 18 as compressed data. During playback, the compressed data from the storage circuit 18 is decoded by an MPEG2 decoder 17, converted to analog by a D/A converter 11, and output from a terminal 12. In the image compression recording/playback feature in FIG. 2, the characteristics desired for HD are the same as those for the system in FIG. 1, and the characteristics of the pulse generator 5 are as described above.

Figure 3:
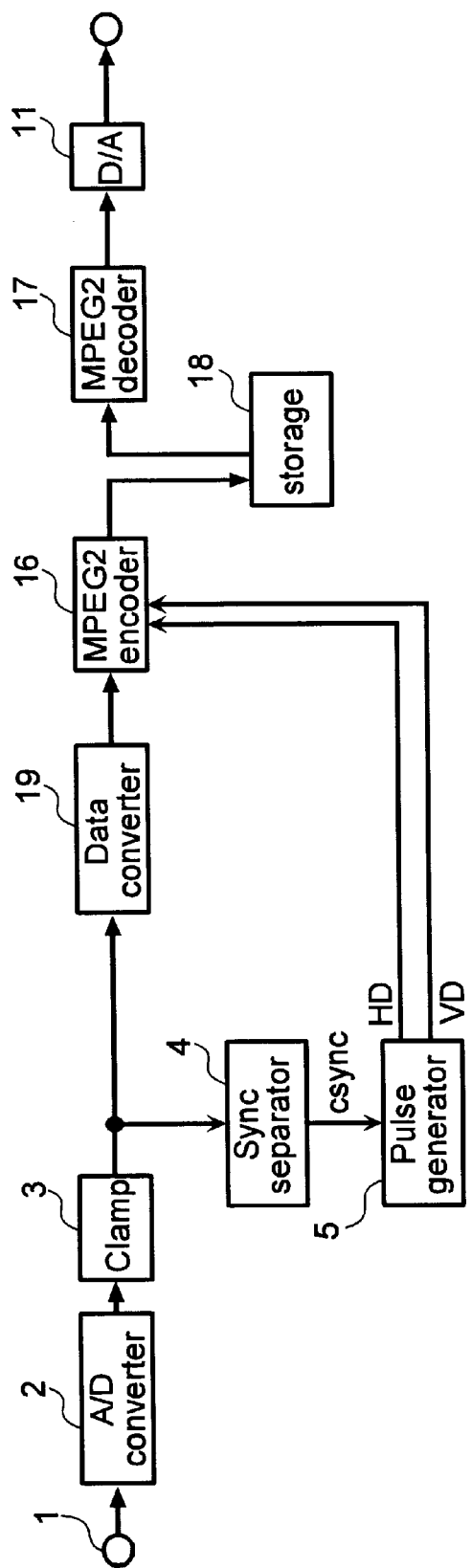

FIG. 3 is a block diagram of an embodiment of the present invention different from the ones shown in FIG. 1 and FIG. 2. As with FIG. 2, an image compression recording/playback feature is implemented. In FIG. 3, a data converter 19 does not perform sync embedding and sends the HD and VD signals, output from the pulse generator 5, to the MPEG2 encoder 16.

The difference of this system from the ones from FIG. 2 and FIG. 3 is in the specifications for the input received by the MPEG2 encoder 16. In practice, the MPEG2 encoder provides an LSI implementation for the data format used in FIG. 2 with embedded sync information and/or the format used in FIG. 3 in which the sync information and the signal data are received as separate inputs. As with the system in FIG. 2, the system in FIG. 3 uses the same characteristics as the pulse generator described above.

Figure 4:
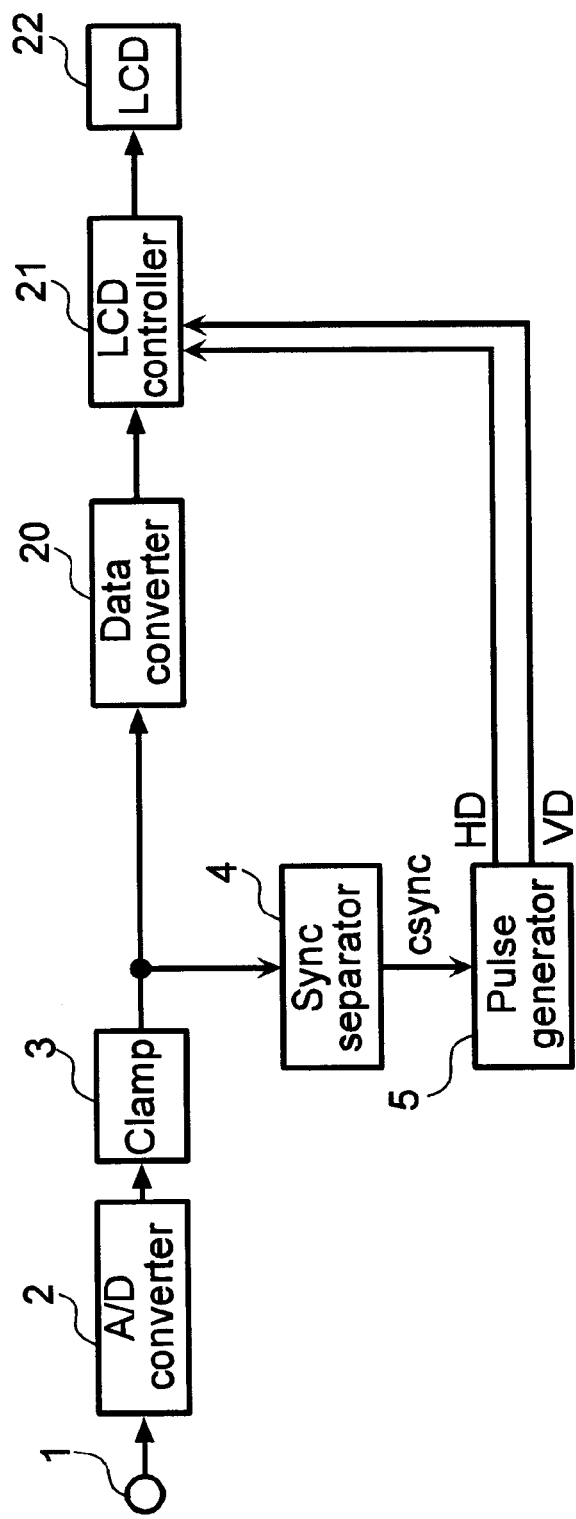

FIG. 4 is a block diagram of an embodiment of the present invention different from the ones shown in FIG. 1, FIG. 2, and FIG. 3. The embodiment implements an LCD screen display. The following is a description of how this embodiment differs from the one in FIG. 3.

In FIG. 4, the output from a data converter 20 is output along with HD and VD from the pulse generator 5 to an LCD controller 21. A control signal from the LCD controller 21 is used to provide scan control for an LCD 22. In the LCD display feature in FIG. 4, the characteristics of the sync information HD are the same as those from the system in FIG. 1, and the characteristics of the pulse generator 5 are as described above.

What is claimed is:

1. A video signal processing device comprising:
a sync separator coupled to receive a video signal and separate a composite sync signal from the video signal;
a pulse generator coupled to receive a composite sync signal from the sync separator and generate horizontal sync information; and
an image processor coupled to receive image information contained in the video signal and the horizontal sync information and performing image processing;
wherein the pulse generator includes a leading edge detector for detecting leading edges of the composite sync signal and a trailing edge detector for detecting trailing edges of the composite sync signal; and the timing for the horizontal sync information is controlled based on timing of the trailing edges,
wherein the pulse generator further includes a trailing edge reception blocking circuit allowing reception of trailing edges only in an interval beginning after the leading edge timing and ending after a time T2 expressed by expression (1) has elapsed from the leading edge timing and blocking reception at all other times;

$$Thsync<T2<0.5H \qquad (1)$$

where Thsync represents a horizontal sync signal width of the video signal, and one H represents one horizontal scan period.

2. A video signal processing device comprising:
a sync separator coupled to receive a video signal and separate a composite sync signal from the video signal;
a pulse generator coupled to receive a composite sync signal from the sync separator and generate horizontal sync information; and
an image processor coupled to receive image information contained in the video signal and the horizontal sync information and performing image processing;
wherein the pulse generator includes a leading edge detector for detecting leading edges of the composite sync signal and a trailing edge detector for detecting trailing edges of the composite sync signal; and the timing for the horizontal sync information is controlled based on timing of the trailing edges.
wherein the pulse generator further includes a leading edge reception blocking circuit blocking reception of the leading edges until a time T1 expressed in expression (2) has elapsed after the leading edge timing;

$$T1>0.5H \qquad (2).$$

3. A video signal processing device comprising:
a sync separator coupled to receive a video signal and separate a composite sync signal from the video signal;
a pulse generator coupled to receive a composite sync signal from the sync separator and generate horizontal sync information; and
an image processor coupled to receive image information contained in the video signal and the horizontal sync information and performing image processing;
wherein the pulse generator includes a leading edge detector for detecting leading edges of the composite sync signal and a trailing edge detector for detecting trailing edges of the composite sync signal; and the timing for the horizontal sync information is controlled based on timing of the trailing edges,
wherein the pulse generator further includes a dropped leading edge detector for generating a dropped leading edge flag when a time T3 indicated in expression (3) has passed after the leading edge timing; and further includes
an interpolated trailing edge generator for generating an interpolated trailing edge based on the trailing edge timing; and
an interpolated trailing edge insertion circuit for receiving the trailing edge and the interpolated trailing edge and inserting the interpolated trailing edge when the dropped leading edge flag is generated;

$$1H<T3<1H+Thsync \qquad (3).$$

4. A video signal processing device comprising:
an A/D converter having an input coupled to an input of the video signal processing device, which receives an input video signal, converts the input video signal, and provides a digital output signal;
a clamp circuit having an input coupled to an output of the A/D converter, which receives the digital output signal, and generates a clamped digital output signal;
a sync separator having an input coupled to an output of the clamp circuit, which separates a composite sync signal from the clamped digital output signal, and generates the composite sync signal as an output signal;
a pulse generator having an input coupled to an output of the sync separator, which receives the composite sync signal, generates a horizontal sync information output signal and a vertical sync information output signal; and
an image processor having a first input coupled to an output of the damn circuit and a second input coupled to an output of the pulse generator, which processes the clamped digital output signal and the horizontal sync information output signal,
wherein the pulse generator further comprises;
a leading edge detector having an input coupled to the input of the pulse generator, which receives the composite sync signal, detects leading edges of the composite sync signal, and generates an equalizing pulse leading edge output signal;
a leading edge reception gate generator which generates an leading edge reception gate output signal;

a first AND gate having a first input coupled to an output of the leading edge detector and a second input coupled to an output of the leading edge reception gate generator, which generates a first ANDed output signal, wherein the equalizing pulse leading edge output signal is blocked when the leading edge reception gate output signal is at a low condition;

a first counter incremented by a system clock wherein an input of the first counter is coupled to an output of the first AND gate, the first counter is reset to zero when the first ANDed output signal is sent as a reset signal, the leading edge reception gate output signal is set to low when the first counter is zero to a time that is greater than one-half of a horizontal scan period;

a trailing edge detector having an input coupled to the input of the pulse generator, which receives the composite sync signal, detects trailing edges of the composite sync signal, and generates an equalizing pulse trailing edge output signal;

a trailing edge reception gate generator having an input couple to an output of the first counter, which generates an output signal;

a second AND gate having a first input coupled to the output of the trailing edge detector and a second input coupled to an output of the trailing edge reception generator, the second AND gate generating a second ANDed output signal, wherein the output signal of the trailing edge reception gate generator is blocked when the first counter is at a time greater than a horizontal sync signal width of the video signal, but less than one-half of the horizontal scan period; and a Vsync detector having an input coupled to the input of the pulse generator, which receives the composite sync signal, provides the vertical sync information output signal to an input of a terminal.

5. A video signal processing device according to claim 4, wherein the pulse generator further comprises:

a second counter having an input coupled to an output of the second AND gate, which is incremented by the system clock, wherein the second counter is reset by the second ANDed output signal;

a dropped leading edge flag generator having an input coupled to an output of the first counter, which generates a dropped leading edge flag when an output signal from the first counter is at a time T3 as indicated by an expression, 1H<T3<1H+Thsync, where H is a horizontal scan period;

an interpolated generator having an input coupled to an output of the second counter, which generates an interpolated signal when the second counter is at zero; and a switch having a first input coupled to an output of the second AND gate, a second input coupled to an output of the interpolated generator, and a third input couple to an output of the dropped leading edge flag generator, wherein the switch provides the interpolated signal as a switch output when the switch receives the dropped leading edge flag as a signal in the third input coupling.

6. A video signal processing device according to claim 5, wherein the switch provides the second ANDed output signal as the switch output when the dropped leading edge flag is not received in the third input coupling.

* * * * *